United States Patent
Aberle et al.

(10) Patent No.: US 6,583,519 B2
(45) Date of Patent: Jun. 24, 2003

(54) APPARATUS FOR GENERATING AND DISTRIBUTING ELECTRICAL POWER TO LOADS IN A VEHICLE

(75) Inventors: Markus Aberle, Dettingen (DE); Mathias Boehmisch, Singen (DE); Wolfgang Zinser, Kirchheim/Teck (DE)

(73) Assignee: Ballard Power Systems AG, Kirchheim/Teck-Nabern (DE)

(*) Notice: Subject to any disclaimer, the term of this patent is extended or adjusted under 35 U.S.C. 154(b) by 0 days.

(21) Appl. No.: 10/051,388

(22) Filed: Jan. 22, 2002

(65) Prior Publication Data
US 2002/0109406 A1 Aug. 15, 2002

(30) Foreign Application Priority Data
Jan. 19, 2001 (DE) .......................... 101 022 43

(51) Int. Cl.⁷ .................................. B06L 11/18
(52) U.S. Cl. .................. 307/10.1; 307/9.1; 307/64; 307/66; 180/65; 318/139; 318/143
(58) Field of Search .................. 307/9.1, 10.1, 307/18, 25, 72, 76, 64–66; 323/299; 363/21, 80; 180/65.1, 65; 280/727; 318/39, 139, 143

(56) References Cited

U.S. PATENT DOCUMENTS

| | | | | |
|---|---|---|---|---|
| 4,839,633 A | * | 6/1989 | Krenik | 340/661 |
| 5,477,091 A | * | 12/1995 | Fiorina et al. | 307/66 |
| 5,994,795 A | * | 11/1999 | Gabillet | 307/66 |
| 5,998,885 A | * | 12/1999 | Tamor et al. | 307/10.1 |
| 6,401,463 B1 | * | 6/2002 | Dukhan et al. | 62/5 |
| 6,404,151 B1 | * | 6/2002 | Bader | 318/39 |

FOREIGN PATENT DOCUMENTS

| | | |
|---|---|---|
| DE | 19810468 | 9/1999 |
| DE | 19810467 | 10/1999 |
| DE | 19855076 | 6/2000 |
| DE | 19954306 | 5/2001 |

\* cited by examiner

*Primary Examiner*—Brian Sircus
*Assistant Examiner*—Calixto Rodriguez
(74) *Attorney, Agent, or Firm*—Crowell & Moring LLP

(57) ABSTRACT

An apparatus for generating and distributing electrical power in a vehicle which has at least one electric drive motor connected via a converter to a fuel cell unit, with the fuel cell unit being connected to at least one first, one second and one third voltage network, and with each voltage network having at least one associated electrical load and/or at least one associated energy store. The first voltage network is formed by the fuel cell voltage network and is connected via a first bidirectional DC/DC converter to the second voltage network and the first bidirectional DC/DC converter provides DC isolation between the first voltage network and the second voltage network. The second voltage network is connected via a second bidirectional converter to the third voltage network.

14 Claims, 2 Drawing Sheets

APPARATUS FOR GENERATING AND DISTRIBUTING ELECTRICAL POWER TO LOADS IN A VEHICLE

BACKGROUND AND SUMMARY OF THE INVENTION

This application claims the priority of German Patent Application 101 022 43.3, filed Jan. 19, 2001, the disclosure of which is expressly incorporated herein.

The invention relates to an apparatus for generating and distributing electrical power in a vehicle.

An apparatus for electrical power generation using a fuel cell system in a vehicle is known from the application, was not published previously, with the German reference DE 19954306.2. The fuel cell voltage network is a high-voltage network and, in this arrangement, is connected via a DC/DC converter to a second high-voltage network, which contains an energy store. The energy store is connected via protective switches to the DC/DC converter and to ground. At least one low-voltage network, which contains an energy store, can be connected via a further DC/DC converter to the fuel cell voltage network.

Particularly in vehicles, the energy store in the second high-voltage network is subject to stringent requirements with regard to insulation and energy store management, in order to protect, for example, people, the energy stores and the low-voltage electronics. Additional components such as battery protective switches are required. In a vehicle, high-voltage energy stores represent a special case, which is associated with increased cost, space requirement and weight.

The object of the present invention is to develop the apparatus described initially such that personnel safety and the safety of parts of the vehicle are ensured, with simplified apparatus.

The advantage of the invention is the lack of a requirement for any additional protective switches, via which the high-voltage energy store is connected to the DC/DC converter and to ground. This leads to a simplified and compact circuit design, since fewer components are used. The weight of, and the space required by, the arrangement are reduced.

Another advantageous feature is that low-cost, low-voltage energy stores can be used.

It is self-evident that the features mentioned above and the features which are still to be explained in the following text can be used not only in the respectively stated combination but also in other combinations or on their own, without departing from the scope of the present invention.

Further advantages and refinements of the invention will become evident from the further claims and from the description.

Other objects, advantages and novel features of the present invention will become apparent from the following detailed description of the invention when considered in conjunction with the accompanying drawings.

BRIEF DESCRIPTION OF THE DRAWINGS

The invention is described in more detail in the following text with reference to a drawing, in the figures of which.

DETAILED DESCRIPTION OF THE PREFERRED EMBODIMENT

Figure 1:
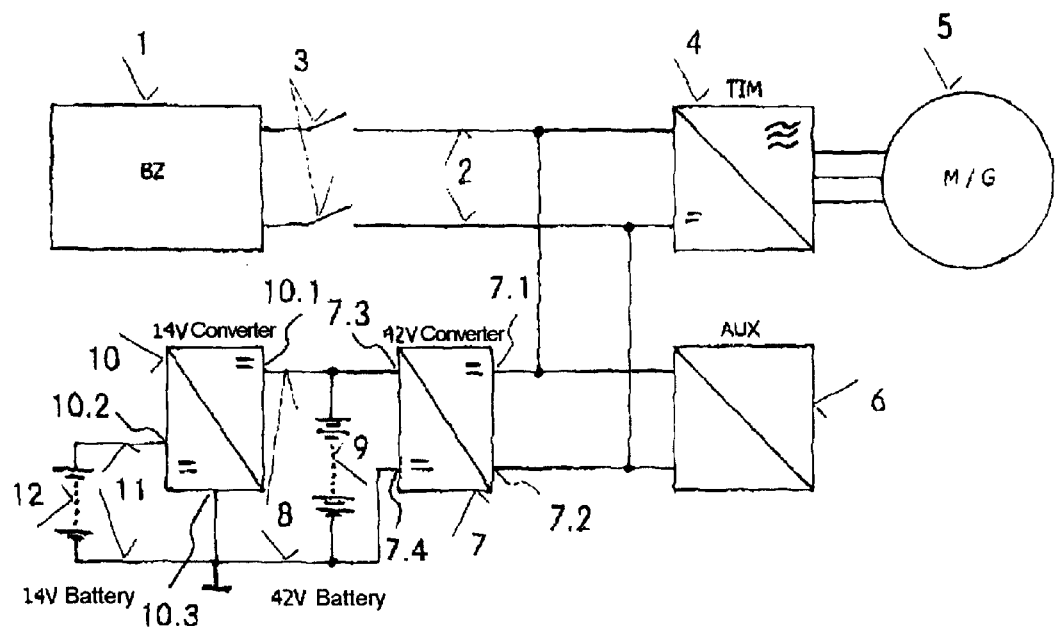
FIG. 1 shows a schematic illustration of a preferred power generation and distribution system with separately illustrated first and second DC/DC converters.

FIG. 1 shows a schematic illustration of a preferred power generation and distribution system. The fuel cell unit 1, which comprises electrically interconnected individual fuel cells which may preferably be in the form of PEM cells, feeds electrical loads via a preferably two-pole line network 2. The line network 2 is referred to as the first voltage network 2. The fuel cell unit 1 is expediently connected to the first voltage network 2 via fuel cell protective switches 3, which may be in the form of two-pole protective switches or in the form of two single-pole protective switches. The first voltage network 2 corresponds to the fuel cell voltage network and may, for example for traction purposes, have a voltage level of, for example, a few hundred volts.

The first voltage network 2 is connected via a converter 4 to an electrical load, preferably an electrical drive motor 5 which, for example, drives the wheels of the vehicle. The first voltage network 2 can be connected to further electrical loads, for example the auxiliary drives and auxiliary appliances which are combined as a unit 6 in FIG. 1. Loads such as these may be, for example, an air compressor motor for a fuel cell system (which is not illustrated) and/or a pump motor for supplying the fuel cell system with media such as fuel and/or water.

Furthermore, the two-pole first voltage network 2 is connected to the connections 7.1/7.2 of a bidirectional DC/DC interface 7, for example a bidirectional DC/DC converter, whose connections 7.3/7.4 are connected to a two-pole second voltage network 8. The connection 7.4 is expediently connected to ground. The rated voltage of the second voltage network 8 is below the rated voltage of the first voltage network 2 and is preferably less than or equal to the safety extra-low voltage in accordance with the requirement of DIN VDE 0100. In accordance with DIN VDE 0100, protection against direct contact must be ensured where a DC voltage exceeds 60 V. The safety extra-low voltage is a DC voltage of less than 60 V, in accordance with DIN VDE 0100. The expression rated voltage means that voltage at which an appliance, a component or a voltage network is normally operated. The second voltage network 8 is preferably a 42 V vehicle network. The DC/DC converter 7 provides DC isolation between the first voltage network 2 and the second voltage network 8. The advantage is that the high-voltage network which is formed by the first voltage network 2 is reliably electrically isolated from the low-voltage network which is formed by the second voltage network 8.

The second voltage network 8 is connected to a first energy store 9. If the second voltage network 8 has a preferred rated voltage of 42 V, a first energy store 9, for example a battery and in particular a lead-acid battery, and/or what is referred to as a supercapacitor, with a rated voltage of 36 V and a power rating of about 1 kW or more, are expediently used. The supercapacitors are also referred to in the following text as SuperCaps. The second voltage network 8 can supply a range of further electrical loads, for example further auxiliary drives, fans, servosteering.

The second voltage network 8 is connected to the connections 10.1/10.3 of a second DC/DC converter 10. The second DC/DC converter 10 is connected via the connections 10.2/10.3 to a two-pole third voltage network 11. The connection 10.3 is expediently an earth connection. The third voltage network 11 preferably has a lower rated voltage than the second voltage network 8. The third voltage network 11 is connected to a second energy store 12. Rechargeable batteries, accumulators and/or SuperCaps, for example, can be used as the first and/or second energy stores 9 and 12. If the third voltage network 11 has a preferred rated voltage of 14 V, a battery with a rated voltage of 12 V is expediently used as the second energy store 12. Further loads, such as a windscreen wiper motor, controllers, incandescent bulbs, can be connected to the third voltage network 12.

The second voltage network 8 preferably has a rated voltage of 42 V. 42 V is intended to mean the rated voltage which is normally used in what are referred to as 42 V vehicle networks in vehicles. The advantage when using a 42 V vehicle network is that the 42 V vehicle network is already widely used in vehicles with internal combustion engines. One advantageous feature is that components for 42 V vehicle networks and for 14 V vehicle networks offer a high level of development confidence, are commercially available, and are thus relatively cheap, such as corresponding batteries and loads.

In a further exemplary embodiment, the first and the second energy store 9 and 12 are in the form of what are referred to as two-voltage energy stores, for example a two-voltage battery with a rated voltage of 36 V and with an additional voltage tap, for example at 12 V. This has the advantage of having a light, compact and space-saving form.

One advantage of the invention is that personnel safety and the safety of parts of the vehicle are improved because the first DC/DC converter 7 provides DC isolation between the first voltage network 2 and the second and third voltage networks 8 and 11, and because the rated voltages of the second and third voltage networks 8 and 11 are less than or equal to the safety extra-low voltage in accordance with DIN VDE 0100.

A further advantage of the invention is that the second voltage network 8 is functionally connected in series with the third voltage network 11. This makes it possible to feed power from the second voltage network 8 into the third voltage network 11, and vice versa. The second energy store 12 whose rated voltage is 12 V can preferably be charged from the first energy store 9, whose rated voltage is 36 V, and vice versa. This means that, for example during normal operation of the vehicle, it is possible to charge the second energy store 12 via the second DC/DC converter 10 from the voltage network 8 and/or possibly to supply electrical loads arranged in the third voltage network 11. Furthermore, electrical power can be transmitted via the second DC/DC converter 10 to the second voltage network 8, from the second energy store 12, for example for starting the fuel cell system.

In a further exemplary embodiment, an additional, third DC/DC converter (which is not identified in any more detail) can be provided, having DC isolation and connecting the first voltage network 2 to the third voltage network 11. It is advantageously possible to supply the energy store 12 and, possibly, electrical loads connected to the third voltage network 11, directly via this third DC/DC converter, which is not identified in any more detail. During starting and/or during acceleration of the vehicle, electrical power can preferably be provided from the energy store 12, via the third DC/DC converter (which is not identified in any more detail) to the auxiliary or additional appliances 6 in the voltage network 2.

Furthermore, power can be supplied via the second DC/DC converter 10 from an external energy store (which is not identified in any more detail), for example another vehicle battery or a standard charger, to the second voltage network 8.

The preferably different rated voltages of the second voltage network 8 and of the third voltage network 11 allow a wide spectrum of possible electrical loads to be connected to the power generation and distribution system according to the invention.

Power levels of more than 1 kW are normally required to ensure a rapid starting process for the fuel cell system. One advantage of the preferred 42 V vehicle network as the second voltage network 8 is that it provides a high electrical power, which is particularly advantageous, for example, when starting the fuel cell system, during acceleration and when the vehicle is idling, and is provided via the first DC/DC converter 7 to the drive motor 5 and/or to the auxiliary and additional appliances 6. During normal operation of the vehicle, the first energy store 9 is charged from the first voltage network 2 via the first DC/DC converter 7. This advantageously means that the fuel cell quickly reaches its operation temperature. For example, when the vehicle is braking, the drive motor 5 can be operated as a generator and, in this case, the electrical power which is generated can be supplied via the first DC/DC converter 7 to the first energy store 9. This leads to an improvement in the efficiency of the overall system, since the braking energy is not lost.

In a further exemplary embodiment, an additional, fourth voltage network, which is not identified in any more detail, can be connected to the first voltage network 2 via a fourth DC/DC converter, which is not identified in any more detail. This fourth voltage network preferably has a rated voltage which is greater than the safety extra-low voltage in accordance with DIN VDE 0100, and contains at least one electrical load (which is not identified in any more detail) and/or at least one third energy store, which is not identified in any more detail. This third energy store, which is a high-voltage energy store, advantageously allows relatively high power levels to be provided, for example for starting and/or accelerating the vehicle and/or for operating electrical loads which require a high power level. A further advantage occurs when the vehicle is braking, whereby more energy can be stored with the aid of the third energy store.

Figure 2:
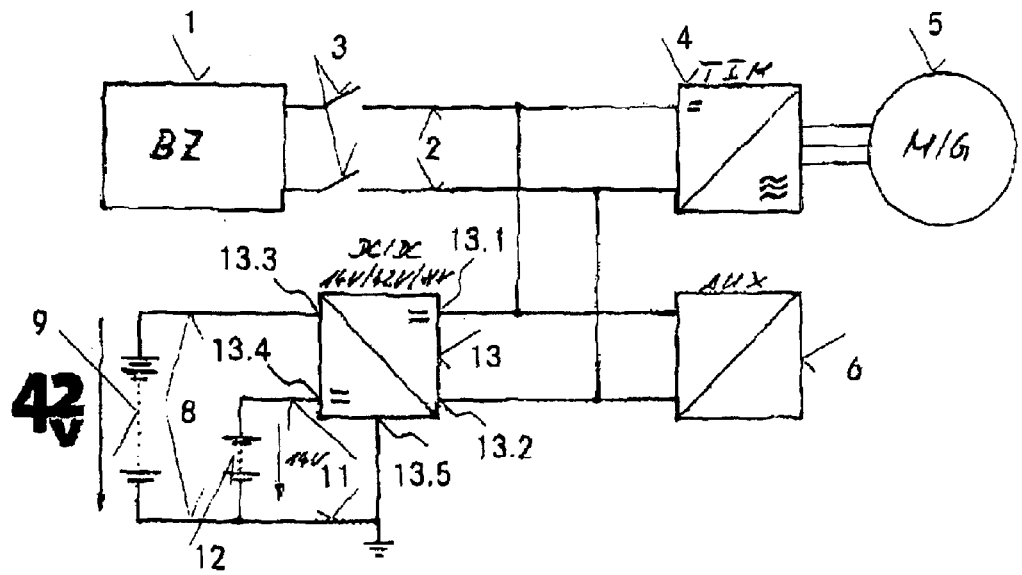
FIG. 2 shows a schematic illustration of a preferred power generation and distribution system with first and second DC/DC converters illustrated in integrated form.

FIG. 2 shows a further schematic illustration of a preferred power generation and distribution system using a fuel cell system 1. Identical components are provided with the same reference symbols as in FIG. 1. In contrast to the previous FIG. 1, the first DC/DC converter 7 and the second DC/DC converter 10 are integrated in a common housing 13. The DC/DC converters 7, 10 in the housing 13 are connected via the connections 13.1/13.2 to the first voltage network 2, via the connections 13.3/13.5 to the second voltage network 8, and via the connections 13.4/13.5 to the third voltage network 11. The connection 13.5 is an earth connection.

It is an advantage with the embodiment that the two DC/DC converters for the second and third voltage networks 8, 11 require only a single ground connection. The power supply for operation of the two DC/DC converters may also be common. Common cooling can also be provided for the two DC/DC converters. In the same way, a data bus connection, for example to a controller and/or further components, and components for smoothing current and/or voltage, for EMC filtering and for central protection against overvoltage, can be used jointly. The abbreviation EMC stands for electromagnetic compatibility. Connections and lines can likewise be used jointly. Furthermore, this embodiment has the advantage of having a light, compact, space-saving form, with a smaller number of components.

Figure 3:
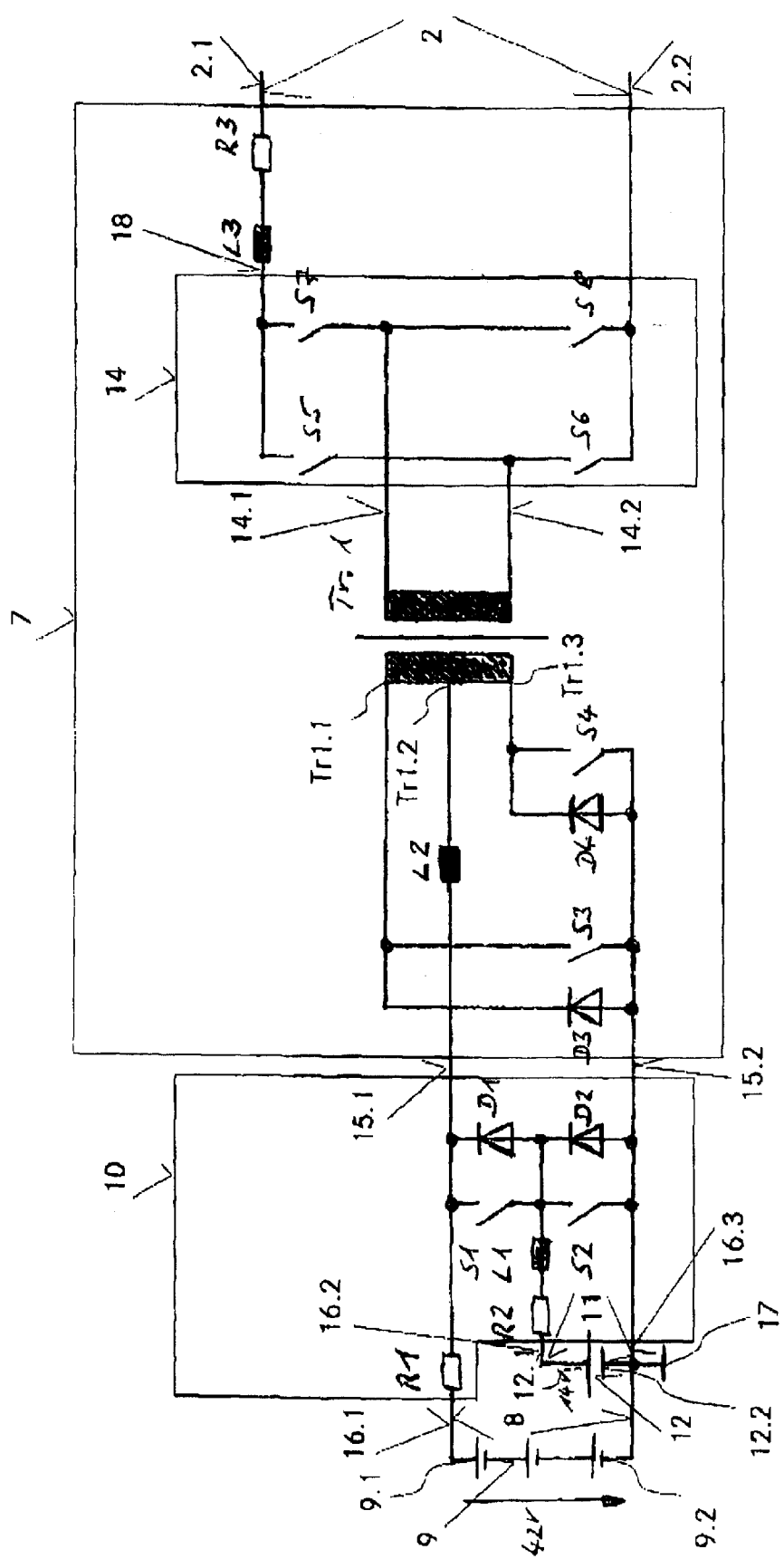
FIG. 3 shows an exemplary embodiment of a preferred power distribution system, illustrating first and second DC/DC converters.

FIG. 3 shows a preferred embodiment of the apparatus, advantageously having first and second DC/DC converters 7 and 10 combined in a common housing, which is not illustrated. Identical components and assemblies are provided with the same reference symbols as in FIG. 1 and FIG. 2. The two-pole first voltage network 2, which is a floating network, is connected to the first DC/DC converter 7. The DC/DC converter 7 is connected via the lines 15.1/15.2 to the second DC/DC converter 10. The line 15.2 is connected to earth 17.

The second DC/DC converter 10 is connected via the lines 16.1/16.3 to the second voltage network 8, and via the lines 16.2/16.3 to the third voltage network 11. The line 16.3 is connected to earth 17. A first energy store 9 is arranged in the second voltage network 8. Further electrical loads can expediently be arranged in parallel with the first energy store 9. The line 16.1 is connected to the connection 9.1 of the first energy store 9. The connection 9.2 of the first energy store 9 is connected to earth 17. A second energy store 12 is arranged in the third voltage network 11. Further electrical loads can expediently be arranged in parallel with the second energy store 12. The connection 12.1 of the second energy store 12 is connected to the line 16.2. The connection 12.2 of the second energy store 12 is connected to earth 17. Capacitors for smoothing and filtering voltage and/or current, load-reduction circuits and diodes for rectification are expediently used in the first voltage network 2, but are not shown in FIG. 3, for clarity reasons.

The line 2.1 of the first voltage network 2 is connected to one pole of a resistor R3. A second pole of the resistor R3 is connected to one pole of an inductance L3. A second pole of the inductance L3 is connected to the line 18. The inductance L3 is used in particular for current smoothing. The resistor R3 is used in particular for current measurement. An alternative current sensor may be used. The line 18 and the line 2.2 are connected to the bridge circuit 14. The bridge circuit comprises four switches S5, S6, S7, S8, of which S5 and S6 are connected in series with one another, and are connected in parallel with S7 and S8, with S7 and S8 being connected in series with one another. The switches S5 and S8 are opened and closed alternately, with the switches S6 and S7 being opened and closed at the same time, in order to act as an inverter for the voltage in the first voltage network 2 in the operating mode in which power is fed from the first voltage network 2 to the second voltage network 8. This means that the bridge circuit is used to control the power flow direction from the first voltage network 2 to the second voltage network 8. Voltage which is fed from the second voltage network 8 via the first DC/DC converter 7 into the first voltage network 2 is rectified by means of diodes, which are not identified in any more detail, but which are connected back-to-back in parallel with the switches S5, S6, S7 and S8, in the normal way. Back-to-back in parallel means that the forward current flow direction through the diodes is in the opposite direction to the preferred current flow direction through the switches. These diodes are not shown in order to keep the figure simple and clear.

The lines 14.1 and 14.2 connect the bridge circuit to one side of the transformer Tr1 in the DC/DC converter 7, with the line 14.2 being connected to the bridge circuit 14 between the switches S5 and S6, and the line 14.1 being connected to the bridge circuit 14 between the switches S7 and S8. The other side of the transformer Tr1 has a centre tap Tr1.2, which is connected to one pole of an inductance L2.

The pole Tr1.1 on this side of the transformer Tr1.1 is connected to the cathode of the diode D3. The pole Tr1.3 on this side of the transformer is connected to the cathode of the diode D4. The anodes of the diodes D3 and D4 are connected to earth 17. The diodes D3 and D4 are used to rectify the current flowing on this side of the transformer Tr1 when the apparatus operating mode is such that power is being fed from the first voltage network 2 into the second voltage network 8. The diodes D3 and D4 are arranged back-to-back in parallel with a switch S3 and a switch S4. The switches S3 and S4 can be used for synchronous rectification when power is being fed from the first voltage network 2 into the second voltage network 8. In the operating mode mentioned above, this leads to increased efficiency. In an operating mode in which power is being fed from the second voltage network 8 into the first voltage network 2, the switches S3 and S4 are operated alternately in order to act as an inverter for the voltage for the second voltage network 8. The inductance L2 is used, in particular, for current smoothing.

The cathode of the diode D1 is connected to the other pole of the inductance L2. The cathode of the diode D2 is connected to the anode of the diode D1. The anode of the diode D2 is connected to earth 17. The diode D1 is connected back-to-back in parallel with a switch S1. The diode D2 is connected back-to-back in parallel with a switch S2. The cathode of the diode D1 is also connected to one pole of a resistor R1, whose second pole is connected to the line 16.1. The resistor R1 is used in particular for current measurement. Some other current sensor can be used instead of the resistor R1. The connection 9.2 of the first energy store 9 is connected to ground 17.

One pole of an inductance L1 is connected between the anode of the diode D1 and the cathode of the diode D2. One pole of a resistor R2 is connected to the other pole of the inductance L1. The other pole of the resistor R2 is connected to the line 16.2. The resistor R2 is used in particular for current measurement. Some other current sensor can be used instead of the resistor R2. The connection 12.2 of the second energy store 12 is connected to earth 17.

When the switch S1 is being closed and the switch S2 is open, the second energy store 12 is charged with energy from the first voltage network 2 and/or from the second voltage network 8. In order to recharge the first energy store 9 from the third voltage network 11, when the switch S1 is open, the switch S2 remains closed until the inductance L1 has been magnetised. The switch S2 is then opened. The charging of the first and of the second energy stores 9 and 12 can be adjusted by means of the switching frequency or the duty ratio of the switches S1 and S2. The inductances L1 and L2 act in particular as energy storage inductors. Furthermore, they are used for current smoothing. The two DC/DC converters 7 and 10 may be operated independently of one another.

The switches S1, S2, S3, S4, S5, S6, S7 and S8 are preferably in the form of MOSFETs and/or IGBTs. The rated voltages in the second and third voltage networks 8 and 11 are preferably 42 V and 14 V, respectively, and the rated voltages of the first and second energy stores 9, 12 are preferably 36 V and 12 V, respectively. The first and second energy stores 9 and 12 are preferably batteries and/or SuperCaps. The first energy store 9 preferably has a power rating of about 1 kW or more. In order to minimize costs, the first energy store 9 can be in the form of three series-connected batteries, each having a rated voltage of 12 V.

In a further advantageous refinement, a capacitor, which is not identified in any more detail, in particular an electrolytic capacitor, is connected in parallel with the first energy store 9. This capacitor is advantageously used, together with the inductance L2, for current smoothing.

In a further advantageous refinement of the invention, a SuperCap, which is not identified in any more detail, is connected in parallel with the first energy store 9. This has the advantage that, for example in order to accelerate the vehicle, a higher power level can be fed into the first voltage network 2, and higher power levels are thus available. A further advantage is that, for example when the vehicle is being braked, more energy can be stored. For the same power requirement, it is possible to reduce the requirement for the power rating of the first energy store 9 by connecting the SuperCap, which is not identified in any more detail, in parallel. Connecting the SuperCap in parallel advantageously makes it possible to increase the life of the first energy store 9, since the charging/discharge currents are shared between the SuperCap and the first energy store 9, and the first energy store 9 therefore has to convert less energy than would be the case in a configuration without a parallel-connected SuperCap.

In a further advantageous refinement of the invention, the current and/or voltage measured values from the first, second and third voltage networks 2, 8 and 11 are supplied in digitized form directly or indirectly via the first and/or second DC/DC converter 7, 10 to a controller, which is not illustrated. By way of example, the current measurement in FIG. 3 is provided by the resistors R1, R2 and R3. Other current sensors may also be used. The controller processes the measured values and/or makes them available via a vehicle-internal data bus, for example a CAN bus, as well as any other components connected to the data bus. It is thus possible for an energy storage management system connected to the data bus, for example a battery management system read the measured values and to make an estimate of the state of charge of the energy stores 9, 12, preferably by integration of the current measured values. The energy management can also be carried out directly by the DC/DC converters 7, 10, since the most important characteristic variables such as the current and voltage have already been detected in the DC/DC converters, and are thus available there.

In a further advantageous refinement to the invention, sensors, which are not illustrated, are provided for measuring the temperature of the first and second energy stores 9, 12, and are connected to the first and second DC/DC converters 7, 10. An energy storage management system can obtain the temperature values directly from the first and second DC/DC converters 7, 10, and can evaluate them. The temperature measured values can be made available to a controller, which is connected to a data bus but is not illustrated, and to other loads connected to the data bus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for generating and distributing electrical power in a vehicle having at least one electric drive motor connected via a converter to a fuel cell unit, said fuel cell unit being connected to at least one first voltage network, one second voltage network and one third voltage network, wherein each of said voltage networks includes at least one of at least one associated electrical load and at least one associated energy store, with the first voltage network being connected via a first bidirectional DC/DC converter to the second voltage network wherein, the first bidirectional DC/DC converter provides DC isolation between the first voltage network and the second voltage network, and wherein the second voltage network is connected via a second bidirectional converter to the third voltage network.

2. The apparatus according to claim 1, wherein the second and the third voltage networks are low-voltage networks with rated voltages which are less than or equal to the safety extra-low voltage in accordance with the requirements of DIN VDE 0100.

3. The apparatus according to claim 2, wherein the rated voltage of the second voltage network is higher than the rated voltage of the third voltage network.

4. The apparatus according to claim 1, wherein the third voltage network is additionally connected to the first voltage network via a third bidirectional DC/DC converter, which provides DC isolation between the first voltage network and the third voltage network.

5. The apparatus according to claim 1, wherein a first one of said at least one associated energy store in the second voltage network and a second one of said at least one associated energy store in the third voltage network are combined as a two-voltage battery, whose rated voltage corresponds to the rated voltage of the first energy store and which has a tap for a voltage whose magnitude is equal to the rated voltage of the second energy store.

6. The apparatus according to claim 1, further including a fourth voltage network having at least one of at least one associated electrical load and at least one associated energy store, and being connected via a fourth bidirectional DC/DC converter to the first voltage network.

7. The apparatus according to claim 6, wherein the fourth voltage network is a high-voltage network, with a rated voltage which is greater than the safety extra-low voltage in accordance with the requirements of DIN VDE 0100.

8. The apparatus according to claim 1, wherein the first and the second DC/DC converter are arranged in a common housing.

9. The apparatus according to claim 8, wherein the first and second DC/DC converters have at least one of a common power supply and use a common ground connection and common cooling.

10. The apparatus according to claim 8, wherein the first and second DC/DC converters jointly use components for at least one of current and voltage smoothing and components for EMC filtering and/or components for central protection against overvoltage.

11. The apparatus according to claim 1, wherein the first and second DC/DC converters, as subscribers to a data bus, are connected to a controller.

12. The apparatus according to claim 1, wherein the first and second DC/DC converters have sensors for measuring current and voltage.

13. The apparatus according to claim 1, further including sensors for measuring the temperature of the energy stores which are connected to the first and second DC/DC converters.

14. A vehicle electrical power generating and distribution system comprising:

a fuel cell unit;

at least one electric drive motor connected to a converter;

a first voltage network connected between said converter and said fuel cell unit wherein said first voltage network is also connected to a first bidirectional DC/DC converter;

a second voltage network connected to said first bidirectional DC/DC converter wherein said first directional DC/DC converter provides DC isolation between said first voltage network and said second voltage network;

a third voltage network; and a second bidirectional converter connected between said second voltage network and said third voltage network, wherein each of said first, second and third voltage networks are connected to one of at least one electric load and an energy store.

* * * * *